US010863607B2

(12) United States Patent
Leclerc et al.

(10) Patent No.: US 10,863,607 B2
(45) Date of Patent: Dec. 8, 2020

(54) PROJECTION SYSTEMS FOR DISTRIBUTED MANIFESTATION AND RELATED METHODS

(71) Applicant: ESKI Inc., Montreal (CA)

(72) Inventors: Vincent Leclerc, Montreal (CA); Jean-Sébastien Rousseau, Montreal (CA); Vadim Kravtchenko, Montreal (CA); Raymel Alfonso Sallo, Saint Eustache (CA)

(73) Assignee: ESKI Inc., Montreal (CA)

( * ) Notice: Subject to any disclaimer, the term of this patent is extended or adjusted under 35 U.S.C. 154(b) by 180 days.

(21) Appl. No.: 16/273,485

(22) Filed: Feb. 12, 2019

(65) Prior Publication Data
US 2019/0174605 A1 Jun. 6, 2019

Related U.S. Application Data

(63) Continuation of application No. PCT/CA2016/051053, filed on Sep. 7, 2016.

(51) Int. Cl.
*G03B 21/14* (2006.01)
*H04N 9/31* (2006.01)
(Continued)

(52) U.S. Cl.
CPC ......... *H05B 47/155* (2020.01); *G03B 21/206* (2013.01); *G08C 23/04* (2013.01); *H04N 9/31* (2013.01); *H05B 47/19* (2020.01)

(58) Field of Classification Search
CPC ...... H04N 9/3147; G03B 21/14; G03B 21/00; G08C 23/04
See application file for complete search history.

(56) References Cited

U.S. PATENT DOCUMENTS 3,473,428 A 10/1969 Phillips
4,470,044 A 9/1984 Bell
(Continued)

FOREIGN PATENT DOCUMENTS

WO WO 02/101702 A2 12/2002
WO WO 2008/075944 A1 6/2008
(Continued)

OTHER PUBLICATIONS

International Search Report and Written Opinion for Application No. PCT/CA2011/000700 dated Nov. 29, 2011.
(Continued)

*Primary Examiner* — Ryan D Howard
(74) *Attorney, Agent, or Firm* — Wolf, Greenfield & Sacks, P.C.

(57) ABSTRACT

Systems and method for distributed manifestation are described. One such system may comprise a data generator configured to generate data sets comprising state data and corresponding spatial coordinate data. The data sets may be encoded so as to allow a receiving unit to operate within its dynamic range. The data sets may be transmitted, using one or more projectors, in the direction of a target area. The target area may comprise a first area and a second area. In some circumstances, the first and second areas do not overlap in space. In other circumstances, the first and the second areas may overlap, at least partially. The system may further comprise a processor configured to provide a synchronization sequence for synchronizing the projectors to one another.

32 Claims, 12 Drawing Sheets

(51) Int. Cl.
  *H05B 47/155* (2020.01)
  *G08C 23/04* (2006.01)
  *H05B 47/19* (2020.01)
  *G03B 21/20* (2006.01)

(56) References Cited

U.S. PATENT DOCUMENTS

| | | | |
|---|---|---|---|
| 4,706,006 A | 11/1987 | Solomon | |
| 4,729,071 A | 3/1988 | Solomon | |
| 4,777,568 A | 10/1988 | Solomon | |
| 4,811,182 A | 3/1989 | Solomon | |
| 4,893,225 A | 1/1990 | Solomon | |
| 4,897,770 A | 1/1990 | Solomon | |
| 4,926,255 A | 5/1990 | Von Kohorn | |
| 4,958,265 A | 9/1990 | Solomon | |
| 4,974,946 A | 12/1990 | Solomon | |
| 4,983,031 A | 1/1991 | Solomon | |
| 5,026,152 A | 6/1991 | Sharkey | |
| 5,406,300 A | 4/1995 | Tokimoto et al. | |
| 5,433,670 A | 7/1995 | Trumbull | |
| 5,703,622 A | 12/1997 | Evans et al. | |
| 5,719,622 A | 2/1998 | Conway | |
| 5,835,083 A | 11/1998 | Nielsen et al. | |
| 5,934,777 A | 8/1999 | Patton | |
| 5,986,781 A | 11/1999 | Long | |
| 6,084,594 A | 7/2000 | Goto | |
| 6,124,862 A | 9/2000 | Boyken et al. | |
| 6,147,701 A | 11/2000 | Tamura et al. | |
| 6,283,614 B1 | 9/2001 | Okada et al. | |
| 6,404,409 B1 | 6/2002 | Solomon | |
| 6,486,994 B1 | 11/2002 | Giles | |
| 6,556,688 B1 | 4/2003 | Ratnaker | |
| 6,577,080 B2 | 6/2003 | Lys et al. | |
| 6,624,854 B1 | 9/2003 | Isogai et al. | |
| 6,857,746 B2 | 2/2005 | Dyner | |
| 6,921,172 B2 | 7/2005 | Ulichney et al. | |
| 7,161,313 B2 | 1/2007 | Piepgras et al. | |
| 7,180,475 B2 | 2/2007 | Slobodin | |
| 7,203,524 B2 | 4/2007 | Tushinsky et al. | |
| 7,307,541 B2 | 12/2007 | Ikeda et al. | |
| 7,370,978 B2 | 5/2008 | Anderson et al. | |
| 7,554,542 B1 | 6/2009 | Ferraro et al. | |
| 7,736,021 B2 | 6/2010 | Solomon | |
| 7,798,404 B2 | 9/2010 | Gelbman | |
| 7,863,552 B2 | 1/2011 | Cartlidge et al. | |
| 8,033,686 B2 | 10/2011 | Recker et al. | |
| 8,194,118 B2 | 6/2012 | Solomon | |
| 8,312,173 B2 | 11/2012 | Berg et al. | |
| 8,354,918 B2 | 1/2013 | Boyer | |
| 8,502,480 B1 | 8/2013 | Gerszberg et al. | |
| 8,628,198 B2 | 1/2014 | Jalbout et al. | |
| 8,648,541 B2 | 2/2014 | Gerszberg et al. | |
| 8,740,391 B2 | 6/2014 | Leclerc et al. | |
| 8,831,642 B2 | 9/2014 | Moldaysky et al. | |
| 8,845,110 B1 | 9/2014 | Worley, III | |
| 8,941,332 B2 | 1/2015 | Gerszberg | |
| 9,066,383 B2 | 6/2015 | Gerszberg | |
| 9,286,028 B2 | 3/2016 | Leclerc et al. | |
| 9,648,707 B2 | 5/2017 | Leclerc et al. | |
| 9,686,843 B2 | 6/2017 | Van De Sluis et al. | |
| 9,722,649 B2 | 8/2017 | Leclerc et al. | |
| 9,813,091 B2 | 11/2017 | Leclerc et al. | |
| 9,888,550 B2 | 2/2018 | Wein | |
| 9,974,151 B2 | 5/2018 | Leclerc et al. | |
| 10,104,751 B2 | 10/2018 | Leclerc et al. | |
| 2002/0015052 A1 | 2/2002 | Deering | |
| 2002/0118147 A1 | 8/2002 | Solomon | |
| 2002/0140364 A1 | 10/2002 | Inukai | |
| 2002/0199198 A1 | 12/2002 | Stonedahl | |
| 2003/0234914 A1 | 12/2003 | Solomon | |
| 2004/0036813 A1 | 2/2004 | Matsuda | |
| 2004/0130783 A1 | 7/2004 | Solomon | |
| 2004/0145709 A1 | 7/2004 | Colucci et al. | |
| 2005/0128437 A1 | 6/2005 | Pingali et al. | |
| 2005/0151941 A1 | 7/2005 | Solomon | |
| 2006/0033992 A1 | 2/2006 | Solomon | |
| 2006/0097660 A1 | 5/2006 | Scott et al. | |
| 2006/0109274 A1 | 5/2006 | Alvarez et al. | |
| 2006/0126336 A1 | 6/2006 | Solomon | |
| 2006/0139750 A1 | 6/2006 | Solomon | |
| 2006/0173701 A1 | 8/2006 | Gurvey | |
| 2006/0279477 A1 | 12/2006 | Allen et al. | |
| 2007/0064204 A1 | 3/2007 | Miyazawa et al. | |
| 2007/0144047 A1 | 6/2007 | Singh | |
| 2007/0146642 A1 | 6/2007 | Slobodin et al. | |
| 2007/0188715 A1 | 8/2007 | Inazumi | |
| 2007/0200791 A1 | 8/2007 | Meyers | |
| 2008/0055246 A1 | 3/2008 | Okayama et al. | |
| 2008/0136973 A1 | 6/2008 | Park | |
| 2009/0033808 A1 | 2/2009 | Maeda et al. | |
| 2009/0230895 A1 | 9/2009 | De Prycker et al. | |
| 2010/0085279 A1 | 4/2010 | Repko | |
| 2010/0128228 A1 | 5/2010 | Matsuo et al. | |
| 2010/0253700 A1 | 10/2010 | Bergeron | |
| 2011/0001881 A1 | 1/2011 | Kawahara | |
| 2011/0007277 A1 | 1/2011 | Solomon | |
| 2011/0057583 A1 | 3/2011 | Fattizzi | |
| 2011/0164192 A1 | 7/2011 | Ozawa | |
| 2011/0273278 A1 | 11/2011 | Kurt et al. | |
| 2011/0304833 A1 | 12/2011 | Osaka et al. | |
| 2012/0050566 A1 | 3/2012 | Cote et al. | |
| 2012/0056799 A1 | 3/2012 | Solomon | |
| 2012/0094759 A1 | 4/2012 | Barney et al. | |
| 2012/0159331 A1 | 6/2012 | Greve et al. | |
| 2012/0178471 A1 | 7/2012 | Kainulainen et al. | |
| 2013/0065584 A1 | 3/2013 | Lyon et al. | |
| 2013/0231760 A1 | 9/2013 | Rosen et al. | |
| 2013/0250184 A1 | 9/2013 | Leclerc et al. | |
| 2013/0254137 A1 | 9/2013 | Hunt | |
| 2013/0260693 A1 | 10/2013 | Un et al. | |
| 2014/0132181 A1 | 5/2014 | Gerszberg | |
| 2014/0184386 A1 | 7/2014 | Regler et al. | |
| 2014/0237076 A1 | 8/2014 | Goldman et al. | |
| 2014/0240203 A1 | 8/2014 | Leclerc et al. | |
| 2015/0281009 A1 | 10/2015 | Melcher et al. | |
| 2015/0286458 A1 | 10/2015 | Leclerc et al. | |
| 2015/0381793 A1 | 12/2015 | Cerda et al. | |
| 2016/0381762 A1 | 12/2016 | Leclerc et al. | |
| 2017/0006414 A1 | 1/2017 | Tomassini | |
| 2018/0077775 A1 | 3/2018 | Leclerc et al. | |
| 2019/0215929 A1 | 7/2019 | Leclerc et al. | |

FOREIGN PATENT DOCUMENTS

| | | |
|---|---|---|
| WO | WO 2010/116299 A1 | 10/2010 |
| WO | WO 2014/096861 A2 | 6/2014 |
| WO | WO 2014/135711 A1 | 9/2014 |
| WO | WO 2014/182161 A2 | 11/2014 |

OTHER PUBLICATIONS

International Preliminary Report on Patentability for Application No. PCT/CA2011/000700 dated Mar. 8, 2013.

Invitation to Pay Additional Fees for Application No. PCT/CA2016/051053 dated Mar. 10, 2017.

International Search Report and Written Opinion for Application No. PCT/CA2016/051053 dated May 15, 2017.

International International Preliminary Report on Patentability dated Mar. 21, 2019 in connection with International Application No. PCT/CA2016/051053.

Supplementary European Search Report for Application No. EP 11860520 dated Nov. 4, 2015.

International Search Report and Written Opinion dated Jul. 25, 2019 in connection with International Application No. PCT/CA2019/050653.

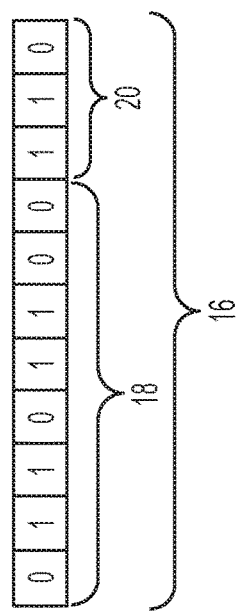
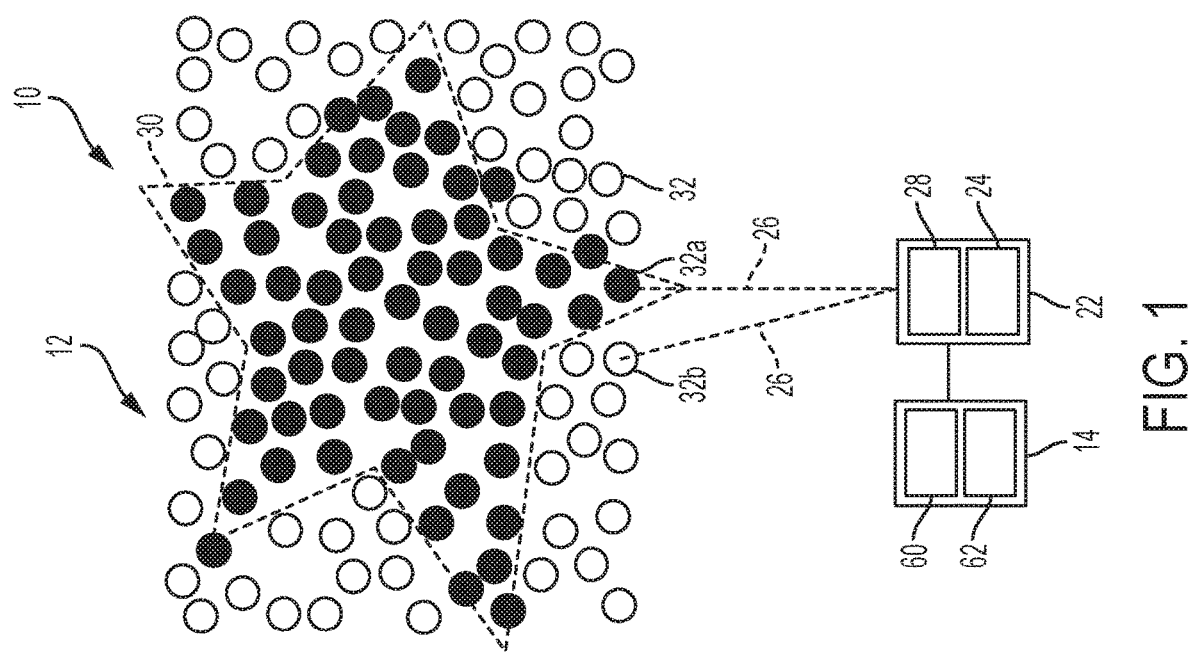

PROJECTION SYSTEMS FOR DISTRIBUTED MANIFESTATION AND RELATED METHODS

RELATED APPLICATION

This application is a continuation of PCT Application No. PCT/CA2016/051053, filed Sep. 7, 2016, entitled "Projection Systems For Distributed Manifestation And Related Methods, the entirety of which is incorporated herein by reference.

BACKGROUND

Projectors are used in a variety of applications, such as light shows or animations for music concerts and other live events, corporate presentations, video conferences, home theaters, etc. Typically, a video projector receives a video signal and projects an image corresponding to the signal onto a surface, using a lens system. Video projector technologies include LCD (Liquid Crystal Display), DLP (Digital Light Processing), LCoS (Liquid Crystal on Silicon), LED (Light Emitting Diode) and Laser Diode.

It is further known to create light animations by modifying the color of a plurality of modular elements in response to infrared (IR) signals sent by a remote control. It is also known in the art to change the state of a plurality of modular elements using a distribution panel to which the module elements are connected.

BRIEF SUMMARY

In some embodiments, a system for providing distributed manifestation is provided. The system may comprise a plurality of receiving units; and at least one transmitter unit configured to transmit data to the plurality of receiving units, the data comprising state information corresponding to each of a plurality of target locations, the state information being represented in the data by a sequence of symbols, the sequence comprising fewer than six equal symbols in a row; wherein each one of the plurality of receiving units is configured to receive the data at a target location of the plurality of target locations, to process the data, and to express a state in accordance with the state information that corresponds to the target location in which the data is received.

In some embodiments, the sequence of symbols comprises fewer than five equal symbols in a row.

In some embodiments, the sequence of symbols comprises fewer than four equal symbols in a row.

In some embodiments, the at least one transmitter unit comprises a light emitter and the state information is encoded in an optical wave emitted by the light emitter.

In some embodiments, the light emitter comprises a laser configured to generate the optical wave.

In some embodiments, the at least one transmitter unit is configured to transmit the state information to a first of the plurality of receiving units by modulating a first optical wave having a first wavelength and to a second of the plurality of receiving units by modulating a second optical wave having a second wavelength different from the first wavelength.

In some embodiments, each of the plurality of receiving units is configured to express a state selected from a group of states consisting of exhibiting one or more visual characteristics, producing one or more sounds, producing an odor, moving, changing shape, and exhibiting one or more tactile characteristics.

In some embodiments, each of the plurality of receiving units comprises a state changing component operable to express the state, the state changing component being selected from a group consisting of light-emitting diodes, organic light-emitting diodes, quantum dots, incandescent lights, neon lights, liquid crystal displays, plasma displays, electronic paper displays, electro-chromic displays, thermochromic displays, electromechanically-actuated light filters, electroluminescent elements and phosphorescent elements.

In some embodiments, the at least one of the plurality of receiving units is disposed in a wearable device.

In some embodiments, the at least one transmitter unit is configured to transmit the state information to a first of the plurality of receiving units during a first time interval and to a second of the plurality of receiving units during a second time interval that is different than the first time interval.

In some embodiments, another system for providing distributed manifestation is provided. The system may comprise a first plurality of receiving units located in a first area; a second plurality of receiving units located in a second area that is separate from the first area; at least one first transmitter unit configured to transmit first data to the first area, such that none of the second plurality of receiving units receives the first data, the first data comprising first state information corresponding to each of a plurality of target locations; and at least one second transmitter unit configured to transmit second data to the second area, such that none of the first plurality of receiving units receives the second data, the second data comprising second state information corresponding to each of the plurality of target locations; wherein each one of the first plurality of receiving units is configured to receive the first data at a first target location of the plurality of target locations, to process the first data, and to express a state in accordance with the first state information that corresponds to the first target location, as a result of the one first receiving unit being at the first target location when the first data is received; wherein each one of the second plurality of receiving units is configured to receive the second data at a second target location of the plurality of target locations, to process the second data, and to express a state in accordance with the second state information that corresponds to the second target location, as a result of the one second receiving unit being at the second target location when the second data is received.

In some embodiments, the first area surrounds, at least in part, the second area.

In some embodiments, the system further comprises a processor configured to synchronize the at least one first transmitter unit with the at least one second transmitter unit by providing the at least one first transmitter unit and the at least one second transmitter unit with a synchronization signal.

In some embodiments, each of the first plurality of receiving units and the second plurality of receiving units is configured to express a state selected from a group of states consisting of exhibiting one or more visual characteristics, producing one or more sounds, producing an odor, moving, and exhibiting one or more tactile characteristics.

In some embodiments, each of the first plurality of receiving units and the second plurality of receiving units comprises a state changing component operable to express a state, the state changing component being selected from a group consisting of light-emitting diodes, organic light-emitting diodes, quantum dots, incandescent lights, neon lights, liquid crystal displays, plasma displays, electronic paper displays, electro-chromic displays, thermo-chromic displays, electromechanically-actuated light filters, electroluminescent elements and phosphorescent elements.

In some embodiments, the at least one first transmitter unit comprises a first light emitter and the first data are encoded in a first optical wave emitted by the first light emitter, and the at least one second transmitter unit comprises a second light emitter and the second data are encoded in a second optical wave emitted by the second light emitter.

In some embodiments, the at least one first transmitter comprises a laser configured to generate the first optical wave.

In some embodiments, the at least one first transmitter unit is configured to transmit the first data to a first receiving unit of the first plurality of receiving units by modulating a first optical wave having a first wavelength and to a second receiving unit of the first plurality of receiving units by modulating a second optical wave having a second wavelength different from the first wavelength.

In some embodiments, yet another system for providing distributed manifestation is provided. The system may comprise a first plurality of receiving units located within a first area; a second plurality of receiving units located within a second area, partially overlapping the first area; at least one first transmitter unit configured to transmit first data to the first area, the first data comprising first state information respectively corresponding to a plurality of target locations; and at least one second transmitter unit configured to transmit second data to the second area, the second data comprising second state information respectively corresponding to a plurality of target locations; wherein each one of the first plurality of receiving units is configured to receive the first data at a first target location of the plurality of target locations, to process the first data, and to express a state in accordance with the first state information that corresponds to the first target location, as a result of each of the first receiving units being at the first target location when the first data is received; wherein each one of the second plurality of receiving units is configured to receive the second data at a second target location of the plurality of target locations, to process the second data, and to express a state in accordance with the second state information that corresponds to the second target location, as a result of each of the second receiving units being at the second target location when the second data is received; and wherein at least one of the first plurality of receiving units is configured to receive both the first data and the second data.

In some embodiments, the at least one of the first plurality of receiving units configured to receive the first data and the second data is further configured to selectively process either the first data or the second data, but not both the first data and the second data.

In some embodiments, the system may further comprise a processor configured to synchronize the at least one first transmitter unit and the at least one second transmitter unit by providing the at least one first transmitter unit and the at least one second transmitter unit with a synchronization signal.

In some embodiments, each of the first plurality of receiving units and the second plurality of receiving units is configured to express a state selected from a group of states consisting of exhibiting one or more visual characteristics, producing one or more sounds, producing an odor, moving, and exhibiting one or more tactile characteristics.

In some embodiments, each of the first plurality of receiving units and the second plurality of receiving units comprises a state changing component operable to express a state, the state changing component being selected from a group consisting of light-emitting diodes, organic light-emitting diodes, quantum dots, incandescent lights, neon lights, liquid crystal displays, plasma displays, electronic paper displays, electro-chromic displays, thermo-chromic displays, electromechanically-actuated light filters, electroluminescent elements and phosphorescent elements.

In some embodiments, the at least one first transmitter unit comprises a first light emitter and the first data are encoded in a first optical wave emitted by the first light emitter, and the at least one second transmitter unit comprises a second light emitter and the second data are encoded in a second optical wave emitted by the second light emitter.

In some embodiments, the at least one first transmitter comprises a laser configured to generate the first optical wave.

In some embodiments, the at least one first transmitter unit is configured to transmit the first data to a first of the first plurality of receiving units by modulating a first optical wave having a first wavelength and to a second of the first plurality of receiving units by modulating a second optical wave having a second wavelength that is different from the first wavelength.

In some embodiments, the at least one second transmitter unit is configured to mask out a third area in which the first area overlaps the second area.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1 is a schematic diagram illustrating a projection system, according to some non-limiting embodiments.

FIG. 2 is a schematic diagram illustrating a data set, according to some non-limiting embodiments.

DETAILED DESCRIPTION

Figure 3:
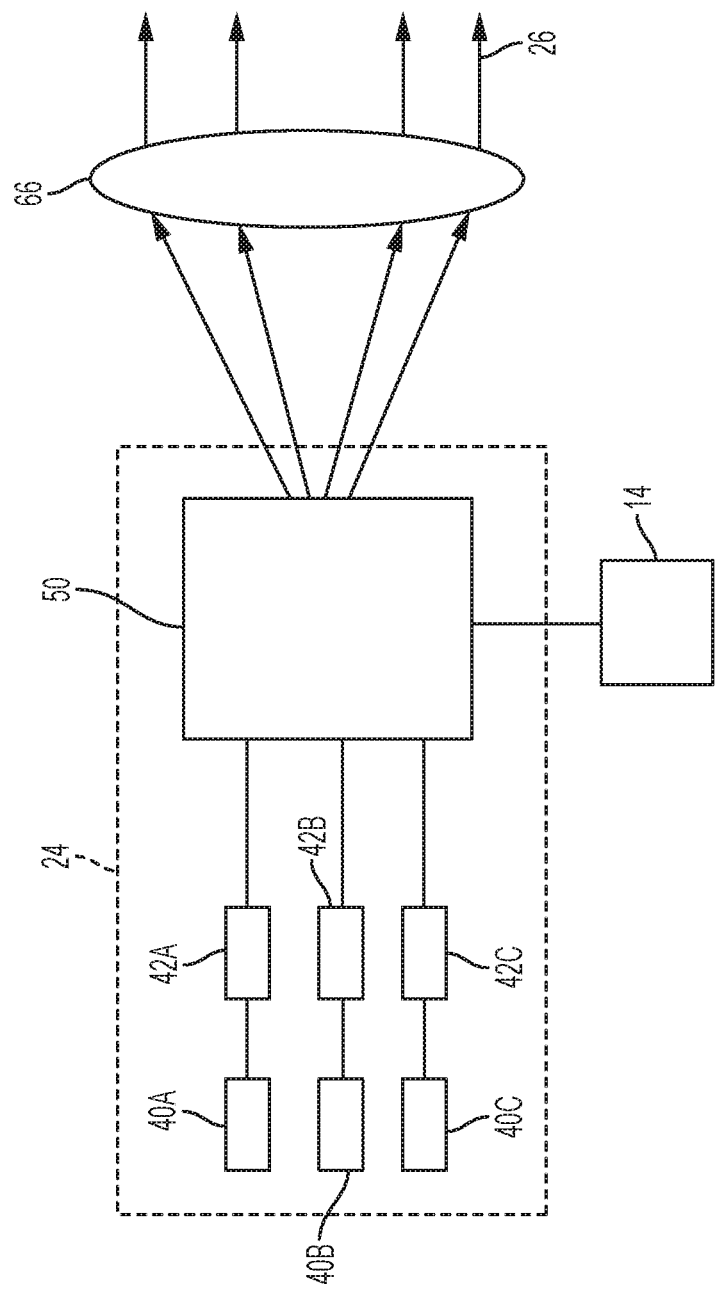
FIG. 3 is a schematic diagram illustrating a projector, according to some non-limiting embodiments.

The Assignee has appreciated that conventional systems for producing a distributed manifestation in an environment may be improved. One example of a conventional system for producing a distributed manifestation in an environment is disclosed in commonly assigned PCT Application No. PCT/CA2011000700 (hereinafter "the '700 application"), which is incorporated herein by reference in its entirety. One representative implementation of the system disclosed in the '700 application comprises a data generator, one or more projectors, and a plurality of receiving units. As disclosed in greater detail below, a data generator may be configured to generate streams of data for producing a distributed manifestation. In some embodiments, a data generator may be implemented via one or more computers. The projector(s) may transmit electromagnetic signals based on data generated by the data generator. Such signals may be varied across different locations targeted by the projector(s) and in some embodiments, may comprise infrared (IR) waves. The receiving units may be dispersed within an environment in any appropriate manner (e.g., each receiving unit may be held or otherwise transported by attendees at an event being held within the environment), and may be fixed or move within the environment. Receiving units located in different areas within the environment may receive different signals, and each receiving unit may respond to a received signal by manifesting a state change. A state change may include exhibiting any suitable physical phenomena. For example, a receiving unit may manifest a state change which includes producing light, changing color, emitting sound, changing shape, emitting an odor, and/or exhibiting any other suitable physical characteristics. By transmitting signals to a plurality of receiving units dispersed within an environment to cause the receiving units to manifest state changes, some representative implementations of the system disclosed in the '700 application may produce a distributed manifestation within the environment, which may include a visual animation, such as a display of changing colors, video, or the presence or absence of light in different areas within the environment.

An environment may comprise any suitable physical space. Examples of such environments include: a public space, a building, a theater, a hall, a museum, a field, a forest, an arena, a stadium, a city street or even the ocean or the sky. The environment need not be bounded by physical structures and may only be limited by the range of propagation of the signals generated by a projection system.

Any of numerous types of events may be held in an environment while a distributed manifestation is produced. It should be appreciated that the term "event" is used herein to refer to any suitable type(s) of interaction between entities, such as between a host and an attendee. A host may comprise any suitable entity or organization. Thus, while many of the embodiments described herein relate to events which are concerts, festivals, sporting events, etc., it should be appreciated that the invention is not limited to events at which large numbers of attendees congregate, or to any particular type of interaction between a host and attendee. For example, an event may comprise a commercial interaction between a host commercial entity and attendee customer who visits one of the host's retail locations, an exhibition organized by a host museum for a relatively small number of attendee visitors, non-commercial interactions (e.g., charitable events organized by host philanthropic organizations, educational events organized by host educational institutions, etc.), and/or any other suitable occurrence at which a host entity interacts with one or more attendees. It should also be appreciated that a distributed manifestation may be produced outside the context of an event. For example, in some embodiments, a distributed manifestation, may be produced in a non-event setting using a system which comprises one or more projecting elements that transmit information to one or more receiving units via visible light (e.g., as part of a so-called "Li-Fi" system) or other optical wireless signal. The information may be encoded for transmission via the optical wireless signal and received and processed by one or more receiving units that may be worn, transported, or mounted within a given environment.

One improvement to conventional systems for producing a distributed manifestation relates to the use of a plurality of projectors to transmit signals to different areas within an environment, such as within a theater or an arena. For example, some embodiments of the present invention relate to using multiple projectors to provide a spatially continuous distributed manifestation. For example, a first projector may provide signals to a first area and a second projector may provide signals to a second area which is contiguous the first area. By coordinating the projection of signals by the first and second projectors, some embodiments may produce a spatially contiguous distributed manifestation, so that attendees looking in the direction of the first and/or the second area may perceive a continuous experience across the areas. Additionally, some embodiments of the invention may employ multiple projectors to enable the utilization of areas in the environment which may otherwise not be reachable using a single projector. In one non-limiting example, if the line of sight of one projector with respect to an area in an environment is obstructed by an obstacle (e.g., a column), then a second projector with an unobstructed vantage point to the area may transmit signals toward the area to improve the experience of audience members within and outside the area.

Another improvement to conventional systems for producing a distributed manifestation in an environment relates to the characteristics of signals transmitted to receiving units in the environment. In this respect, the Assignee has appreciated that electromagnetic waves having a number of consecutive pulses containing an optical carrier that is greater than a certain threshold number may saturate the sensor used by a receiving unit to detect such electromagnetic waves. For example, data streams that exhibit a certain number of consecutive logical ones, such as more than five consecutive logical ones, and therefore include an infrared carrier for more than five consecutive pulses, may saturate the sensor and/or may be considered as noise by the sensor. As a result, such data streams may prevent the receiving unit from manifesting a state change as intended.

Accordingly, in some embodiments of the invention, the electromagnetic waves transmitted by the projector(s) may be encoded using encoding schemes designed to prevent saturation of a sensor. For example, the encoding schemes may be designed to allow a sensor of a receiving unit to operate within its dynamic range. For example, an encoding scheme may map data streams into bit sequences that comprise fewer than a certain number of logical zeros or ones, such as fewer than three, fewer than four, fewer than five or fewer than six.

These and other improvements to conventional systems for producing a distributed manifestation within an environment are described in detail in the sections that follow.

I. System Components for Producing a Distributed Manifestation in an Environment Referring to FIG. 1, a representative projection system 10 according to some non-limiting embodiments is illustrated. The projection system 10 may comprise a data generator 14, a projector 22 and a plurality of receiving units 32. Projector 14 may also be referred to herein as a "transmitter unit", or simply a "transmitter". In some embodiments, the plurality of receiving units 32 are provided with LEDs or LCDs, and may be configured to collectively form a manifestation, such as a visual display. In the example illustrated in FIG. 1, the receiving units are configured to provide a visual display having the shape of a luminous start.

The data generator 14 may be a computer, a data server or any type of device provided with memory 60 and a processor 62, able to store and transmit data to the projector 22. In operation, the data generator 14 may generate a plurality of data sets 16. The data sets generated by the data generator 14 may represent real-time state changes, cues or sequences of state changes to be executed by receiving units 32 located at a specific target location within the environment. Referring to FIG. 2, each data set 16 may comprise at least state data 18 associated with spatial coordinate data 20. Spatial coordinate data 20 may be used to specify an area within an environment. The data sets 16 may include further information, such as headers including information which identifies the information that follows, an identification number associated with a particular projector, block of bytes with additional data and/or instructions, as well as trailers, for confirming the accuracy and stats of the data transmitted. Streams of data sets can take the form of an array, a table, a queue or a matrix containing numerous data structures.

As used herein, the term "state" refers to a mode or a condition which can be displayed or expressed by a receiving unit. For example, a state can take the form of a visual manifestation, such as a color, a level of intensity and/or opacity. The state can also relate to a sound, an odor or a shape. Further, state may relate to a logical condition, such as a state of data stored in a computer-readable medium. State data may reflect a sequence of state changes over time. For example, the state data can be representative of a video stream, the distributed manifestation displayed by the receiving units 32 being a video, each receiving unit 32 thus becoming a pixel within a giant "screen" formed by the plurality of units 32.

In order for the projector 22 to address specific receiving units 32 within the plurality of units, the state data 18 may be associated with spatial coordinate data 20. The term spatial coordinate refers to a coordinate which may take any of numerous forms, such as a position in an array of data, a location within a table, the position of a switch in a matrix addresser, a physical location, etc. Any suitable manner(s) of representing a coordinate's relative position may be employed.

Referring back to FIG. 1, projector 22 may transmit data to the receiving units using electromagnetic waves, such as electromagnetic wave 26. In some embodiments, the electromagnetic wave may comprise an optical wave in the infrared (IR), visible or ultraviolet (UV) portion of the electromagnetic spectrum. Based on the state data received, the receiving units may manifest a state change. For example, receiving unit 32a, located within a target area 30, may turn a light on, such as an LED, while receiving unit 32b outside target area 30 may keep its LED in an off state.

Projector 22 may comprise a signal generator module 24 and a projection module 28. Signal generator module 24 may comprise circuitry to encode an electromagnetic wave with data obtained from data generator 14. As will be described further below, projector 22 may comprise one or more modulators in some embodiments. Projection module 28 may comprise an apparatus for transmitting an electromagnetic wave, obtained from signal generator 24, in the direction of a target area within an environment. For example, when optical waves are used, projection module 28 may comprise one or more lenses.

A projector of the type described herein may comprise circuitry to generate an electromagnetic wave, such as an optical wave, and to encode the electromagnetic wave with data obtained from data generator 14. The projector may be further configured to transmit the electromagnetic wave in the direction of a target area. Such target area may be divided into sub-areas. Within each sub-area may be disposed one or more receiving units. In some embodiments, the projection systems may be configured such that receiving units located within a sub-area receive the same data from a projector. Accordingly, the projector may be configured to spatially modulate portions of an electromagnetic wave. In some embodiments, each modulated portion of the electromagnetic wave may be mapped to a sub-area. In this way, each sub-area may serve as a "pixel" of a distributed manifestation.

FIG. 3 is a schematic diagram illustrating a projector, according to some non-limiting embodiments. Projector 22 may comprise light emitters $40_A$, $40_B$ and $40_C$, carrier modulators $42_A$, $42_B$ and $42_C$ and spatial modulator array 50, which may collectively serve as signal generator module 24. Projector 22 may be in communication with data generator 14 either through a wired connection or wirelessly. While FIG. 3 illustrates three light emitters, it should be appreciated that the invention is not limited in this respect and that any suitable number of light emitters may be used. The light emitters may be implemented using LEDs, lasers or any other suitable type of emitter. In some embodiments, the light emitters may be configured to provide optical waves having the same wavelength. In other embodiments, the light emitters may be configured to provide optical waves having different wavelengths. Optical signals having different wavelengths may be used, in some embodiments, to provide wavelength division multiplexing (WDM) to address different sub-areas of a target area. For example, receiving units located within a first sub-area may be configured to sense optical signals having a first wavelength and receiving units located within a second sub-area may be configured to sense optical signals having a second wavelength.

The optical waves generated by the light emitters may be modulated using carrier modulators $42_A$, $42_B$ and $42_C$. The carrier modulators may provide modulation carriers that are between 1 KHz and 50 GHz in some embodiments, between 10 KHz and 100 MHz in some embodiments, between 30 KHz and 50 KHz in some embodiments, or between any other suitable values. Other ranges are also possible. Different carrier frequencies may be used, in some embodiments, to provide frequency division multiplexing (FDM) to address different sub-areas of a target area. For example, receiving units located within a first sub-area may be configured to sense optical signals modulated with a first carrier frequency and receiving units located within a second sub-area may be configured to sense optical signals modulated with a second carrier frequency.

The optical waves may be modulated with data provided by data generator 14 using spatial modulator array 50. The spatial modulator array may encode different portions of the optical wave according to spatial coordinate data with corresponding state data. In this way individual modulators of the spatial modulator array may be mapped to one sub-areas of a target area.

Figure 4:
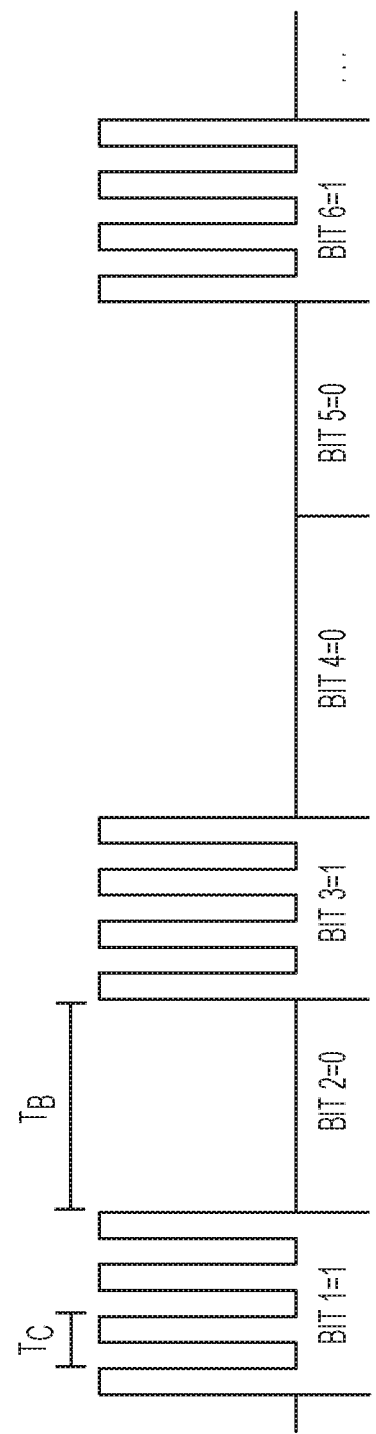
FIG. 4 is a schematic diagram illustrating an exemplary sequence of bits, according to some non-limiting embodiments.

A non-limiting example of an optical signal modulated using a modulator of spatial modulator array 50 is illustrated in FIG. 4, according to some embodiments. FIG. 4 illustrates a sequence of six bits representing the digital sequence "101001". The digital sequence may represent a portion of a state data. As illustrated, the optical signal may be modulated with a carrier frequency having a periodicity $T_c$ equal to the reciprocal of the carrier frequency. For example, if the carrier frequency is equal to 38 KHz, Tc may be equal to 1/38000=26.315 µsec. The bit duration $T_B$ may be configured so as to provide a desired video frame rate. For example, to provide 60 frames/sec with a red green blue (RGB) color model, where each frame is represented by 24 bits (8 bits per color), 60×24=1440 bits/sec may be used. In this case, TB may be equal to 1/1440=694.44 µsec.

II. Signal Encoding Techniques and Components

In some embodiments, a projection system of the type described herein may be configured to encode optical signals in a way so as to allow a sensor of a receiving unit to operate within its dynamic range. In one non-limiting example, a red-green-blue (RGB) color representation may be used to reproduce colors to be displayed in an environment. According to this color representation, a complete set of colors may be reproduced by appropriately combining variations of the primary colors red, green and blue. For example, to reproduce the color white using 8 bits per primary color, a sequence of 24 consecutive logical ones (8 consecutive logical ones for the red, 8 consecutive logical ones for the green and 8 consecutive logical ones for the blue) may be used. Because a logical one contains an optical carrier within its corresponding pulse, having such long sequence of consecutive logical ones may saturate a sensor and/or cause the sensor to consider at least a portion of the logical ones as noise.

In some embodiments, to prevent detection errors, encoding schemes designed to limit the number of consecutive logical ones may be used. The encoding scheme may be designed to reproduce colors using sequences of bits comprising fewer than a predefined number of consecutive logical ones, such as fewer than six in some embodiments, fewer than five in some embodiments, fewer than four in some embodiments or fewer than three in some embodiments. In this way, the number of consecutive pulses containing the optical carrier may be limited, and bit errors caused by the sensor may be prevented.

On the other hand, having a long sequence of consecutive logical zeros may cause a sensor to be overly susceptible to noise. In this respect, because of the absence of the optical carrier when a logical zero is transmitted, a long sequence of consecutive logical zeros may cause a sensor to operate too close to the lower end of its dynamic range and/or may be considered as invalid. As such, in some embodiments of the invention, to prevent distortion, encoding schemes designed to limit the number of consecutive zeros may be used. The encoding scheme may be designed to reproduce colors using sequences of bits comprising fewer than a predefined number of consecutive logical zeros, such as fewer than six in some embodiments, fewer than five in some embodiments, fewer than four in some embodiments or fewer than three in some embodiments.

It should be appreciated that RGB is merely an illustrative color scheme, and that other schemes for reproducing color may be used. The bit sequence illustrated in FIG. 4 comprises fewer than three consecutive logical zeros and fewer than three consecutive logical ones. By reducing the number of consecutive logical ones and zeros, a receiving unit may be maintained below its saturation level and above the lower end of its dynamic range.

Referring back to FIG. 3, the modulated optical waves may be transmitted in the direction of a target area using lens system 66. Lens system 66 may comprise one or more optical lenses, and may serve as projection module 28. The optical lens(es) may be fabricated using materials that exhibit limited optical loss at the desired wavelength(s).

Figure 5:
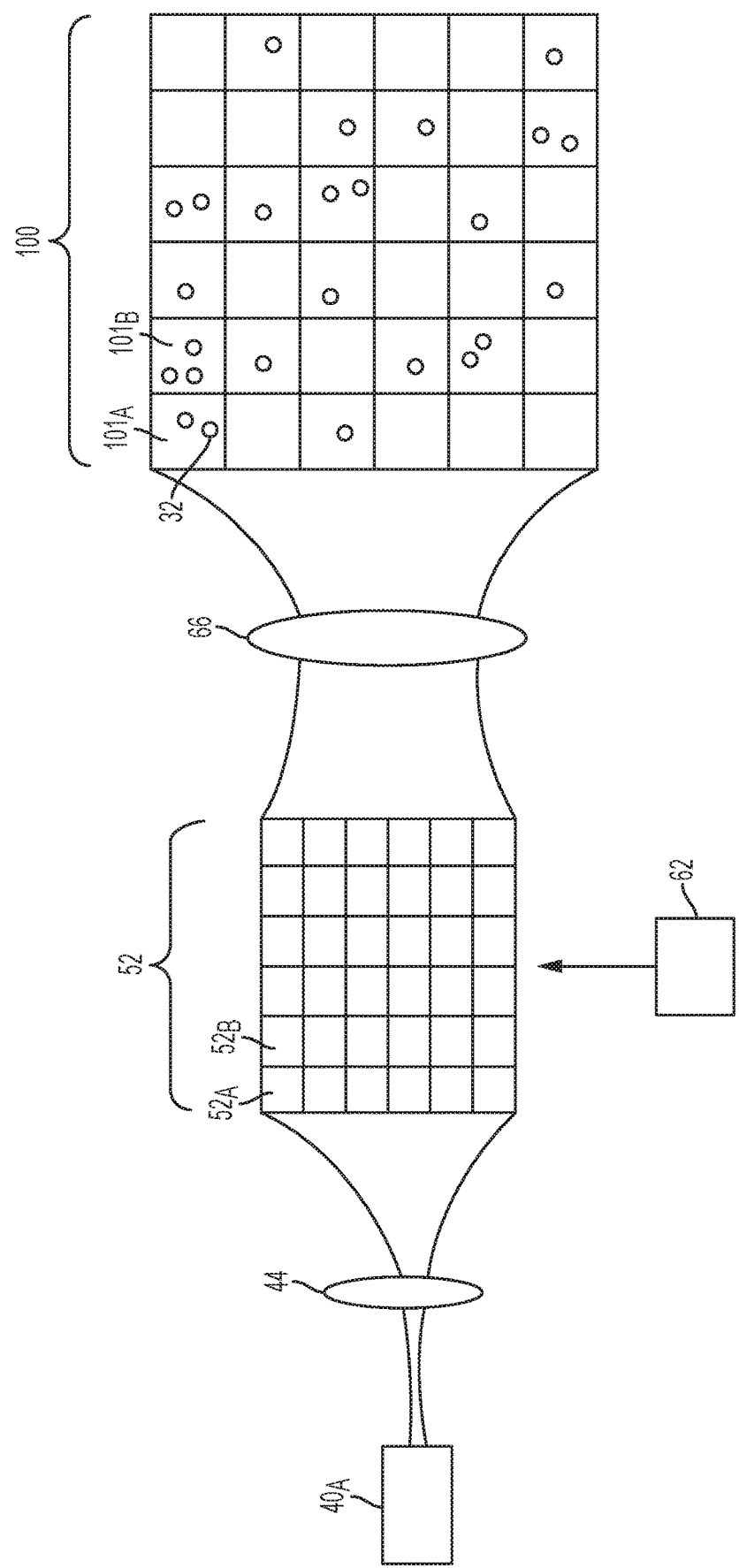
FIG. 5 is a schematic diagram illustrating a projector comprising a micro-mirror array, according to some non-limiting embodiments.

Spatial modulator array 50 may be implemented using a micro-mirror array. The individual micro-mirrors of the micro-mirror array may be configured to modulate different portions of an incoming optical wave. FIG. 5 is a schematic diagram illustrating a projector comprising a micro-mirror array, according to some non-limiting embodiments. The projector of FIG. 5 may comprise a light emitter $40_A$, a lens system 44, a micro-mirror array 52 and lens system 66. The projector may be configured to transmit signals in the direction of target area 100. As described in connection with FIG. 3, light emitter $40_A$ may be configured to generate an optical wave. The optical wave may be modulated using a carrier modulator (not shown in FIG. 5), and may be provided to micro-mirror array 52 using a lens system 44. Lens system 44 may comprise one or more lenses, and may be configured to illuminate the micro-mirror array with a substantially uniform power distribution (e.g., with a variation, across the surface of the micro-mirror array, that is less than 10%). Micro-mirror array 52 may serve as spatial modulator array 50, and may comprise a plurality of micro-mirrors $52_A$, $52_B$, etc. The micro-mirrors may be configured to have, at a given time, one of at least two possible states. The at least two possible states may comprise a reflective state and a transmissive state. In the reflective state, the micro-mirror may block a corresponding spatial portion of the incoming optical wave. In the transmissive state, the micro-mirror may allow the corresponding spatial portion of the incoming optical wave to pass through. The micro-mirrors may be controlled independently from one another, for example using processor 62. The processor may be configured to control the micro-mirrors based on spatial coordinate data and corresponding state data.

The optical wave modulated using micro-mirror array 52 may be transmitted in the direction of target area 100 using lens system 66. In some embodiments, the lens system 66 may be configured to map micro-mirrors to sub-areas of target area 100. For example, micro-mirror $52_A$ may be mapped to sub-area $101_A$, and micro-mirror $52_B$ may be mapped to sub-area $101_B$. Receiving units 32 may be dispersed with target area 100, such that each sub-area may comprise zero, one or more receiving units 32. For example, sub-area $101_A$ may comprise two receiving units 32. The receiving units located within sub-area $101_A$ may receive modulated optical waves obtained through micro-mirror $52_A$. In some embodiments, one micro-mirror of the micro-mirror array may be mapped to one sub-area of target area 100. However the invention is not necessarily limited to a 1-to-1 mapping. Accordingly, 1-to-many or many-to-1 configurations may be utilized in some embodiments. While target area 100 is illustrated as having a rectangular shape, any suitable shape may be used. The shape of a target area may be determined by properly designing the shape of the aperture of lens system 66.

Receiving units of the type described herein may comprise circuitry configured to receive and decode the signals transmitted by a projector. Such circuitry may be coupled to a state changing component. The state changing component may be responsive to state data generated by data generator 14. By way of example and not limitation, the state changing component may comprise light-emitting diodes (LED), organic light-emitting diodes, quantum dots, incandescent lights, neon lights, liquid crystal displays, plasma displays, electronic paper displays, electro-chromic displays, thermo-chromic displays, electromechanically-actuated light filters, electroluminescent elements or phosphorescent elements. In some embodiments, the receiving units may be configured to express a state, such as a visual characteristic, a sound produced, an odor produced, motion or a tactile characteristic. In other embodiments, responsive to state data generated by data generator 14, a receiving unit may express a state by updating data stored in a memory, with or without an accompanying sensorial manifestation. In some embodiments, a receiving unit may be disposed in a wearable device, which may be worn, or held, by an attendee of an event. Examples of wearable devices include wristbands, hats, smart glasses, etc. In this way, the receiving unit may be tied to a person. Accordingly, if an attendee moves from one sub-area to another sub-area of the target area, the receiving unit may become responsive to the data associated with the new sub-area. In some embodiments, a receiving unit 32 may be disposed in a smartphone, a digital media player, a watch, or any other suitable portable device.

Figure 6:
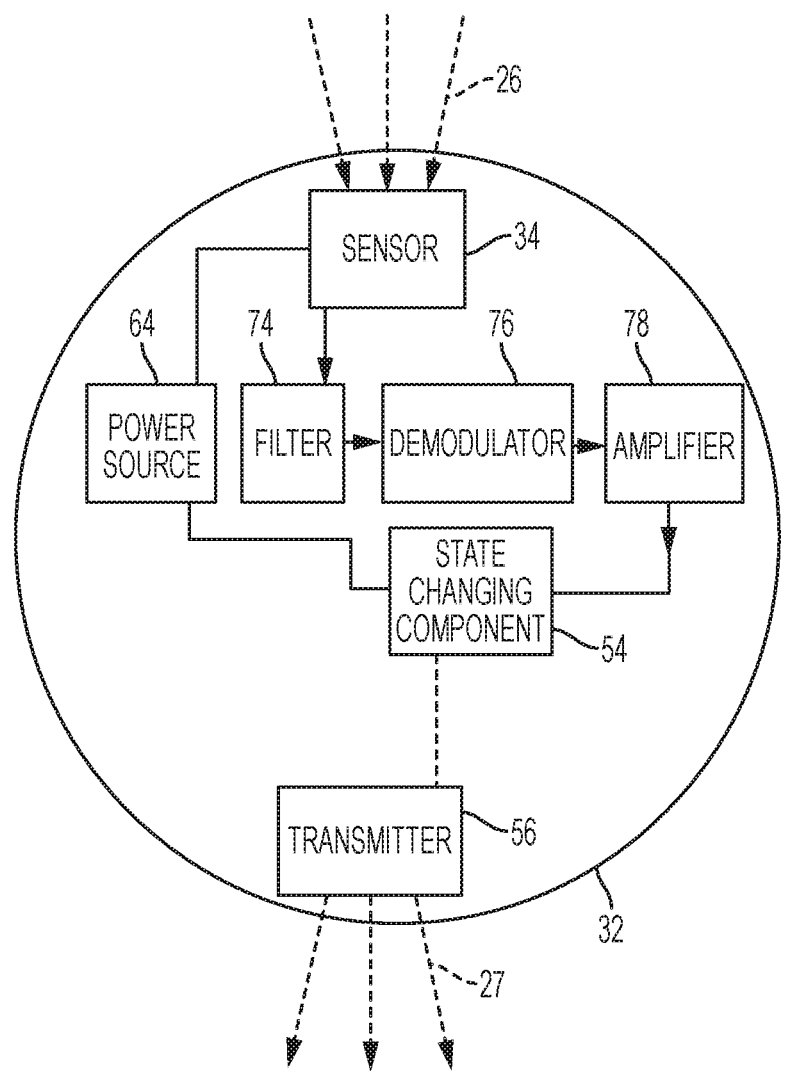
FIG. 6 is a schematic diagram illustrating a receiving unit, according to some non-limiting embodiments.

FIG. 6 is a schematic diagram illustrating a receiving unit, according to some non-limiting embodiments. A receiving unit 32 may comprise sensor 34, a power source 64, a filter 74, a demodulator 76, an amplifier 78, a state changing component 54, a transmitter 56, or any suitable combination thereof. The receiving unit may comprise a sensor configured to sense electromagnetic waves transmitted by a projector 22. For example, a sensor 34 may comprise an optical sensor, such as a photodetector or an avalanche photodiode. Filter 74 may be configured to filter the signal received to reduce noise. Demodulator 76 may be configured to demodulate a signal modulated using a carrier frequency. Amplifier 78 may be configured to amplify the power of the signal received. State changing component 54 may be configured to change a state, such as a brightness or a color, based on the state data received through electromagnetic wave 26. In some embodiments, receiving unit 32 may be a smartphone, and the state changing component may comprise the screen of the smartphone. Power source 64 may be configured to power some or all the components of receiving unit 32. The power source may comprise, in some embodiments, rechargeable batteries. Transmitter 56 may be used to provide feedback to a projector. For example, a transmitter 56 may be configured to provide geo-location information. The order in which the components of receiving unit 32 appear along the data path associated with a received signal is not limited to the embodiment illustrated in FIG. 6. For example, amplifier 78 may be positioned, along the signal data path, between sensor 34 and filter 74, while filter 74 may be positioned between amplifier 78 and demodulator 76. Any suitable arrangement can be used.

III. Projection Techniques and Components

In some circumstances, it may be desirable to use a plurality of projectors of the type described herein to produce a distributed manifestation. For example, this may be the case in an environment that is too large to be covered by a single projector in its entirety. Alternatively, or additionally, the use of multiple projectors may be useful to cover areas that are obstructed by obstacles. In the presence of such obstacles, a single projector may produce a manifestation having gaps. However, by using multiple projectors such gaps may be eliminated.

Figure 7A:
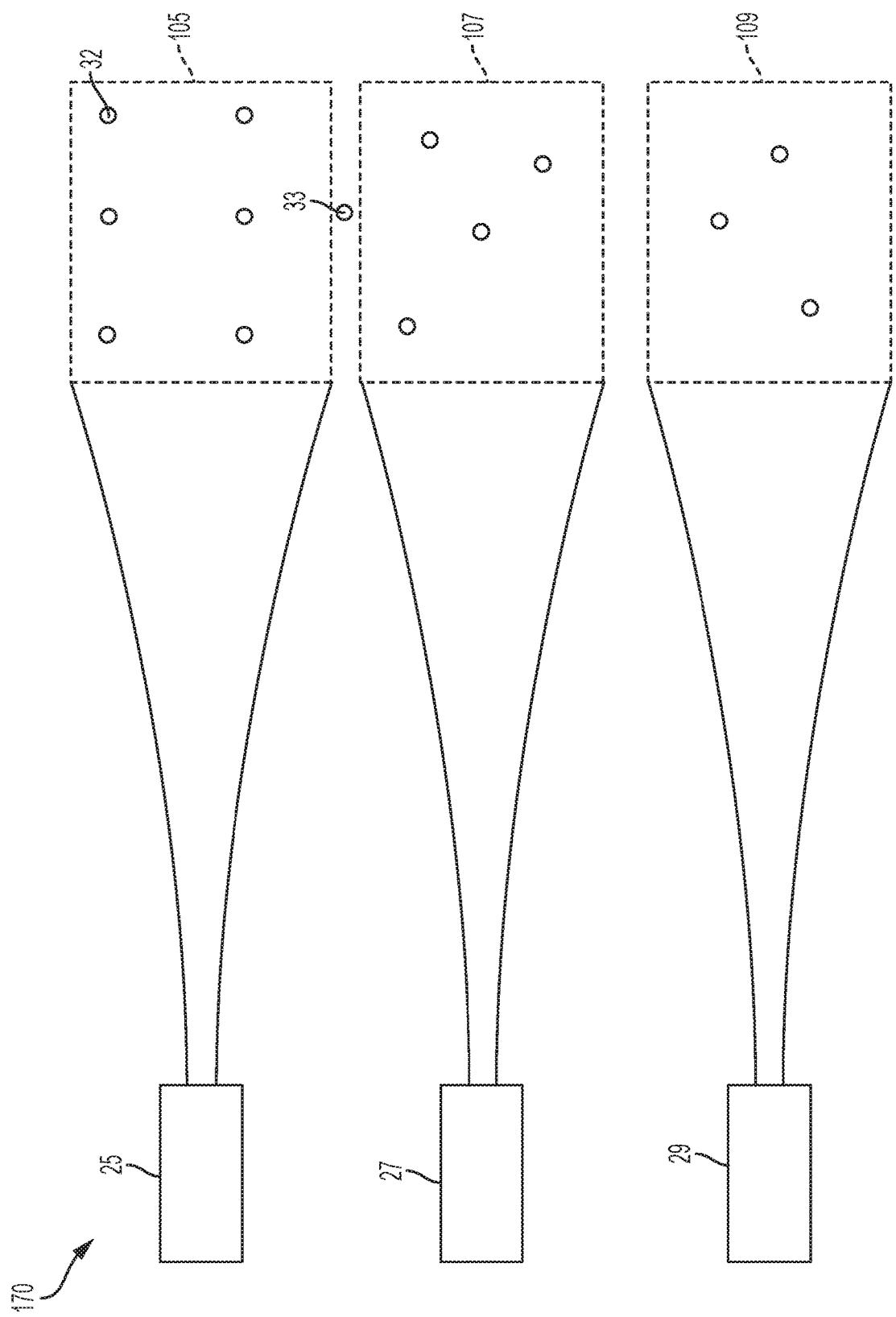
FIG. 7A is a schematic diagram illustrating a plurality of projectors projecting signals covering non-overlapping areas, according to some non-limiting embodiments.

In some embodiments, multiple projectors may be configured to cover respective non-overlapping areas. This configuration may simplify the circuitry used by the receiving unit. Accordingly, in this configuration, a receiving unit may receive, at a given time, only the electromagnetic wave transmitted by one projector. Thus, the receiving unit may not require circuitry to determine which state data is to be processed. On the other hand, having target areas that do not overlap may give rise to regions of the environment that are not covered by any projector. FIG. 7A is a schematic diagram illustrating a plurality of projectors projecting signals covering non-overlapping areas, according to some non-limiting embodiments. Projection system 170 may comprise a plurality of projectors of the type described herein. Projectors 25, 27 and 29 may be implemented using the projectors described in connection with FIGS. 3 and 5. Projector 25 may be configured to cover target area 105, projector 27 may be configured to cover target area 107 and projector 29 may be configured to cover target area 109. As illustrated, target areas 105, 107 and 109 are non-overlapping. The target areas may be separated by a distance that is less than 25 m in some embodiments, less than 10 meters in some embodiments, less than 1 m in some embodiments, or less than any other suitable value. Because the target areas do not overlap, a receiving unit, such as receiving unit 33, may be positioned in an area that is not covered by any one of the projectors.

Figure 7B:
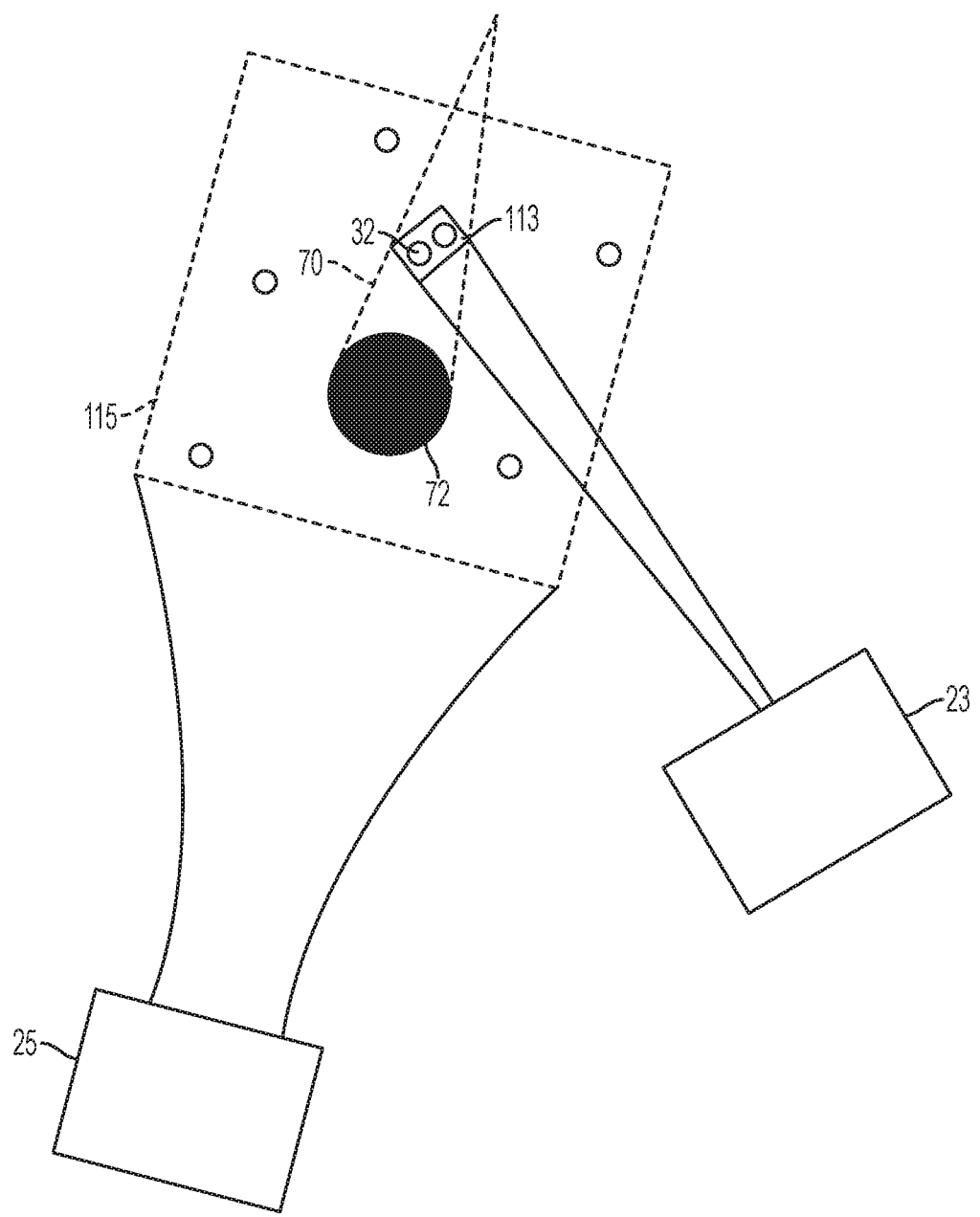
FIG. 7B is a schematic diagram illustrating a plurality of projectors in the presence of an obstacle, according to some non-limiting embodiments.

Multiple projectors may be used to cover areas that would not otherwise be reachable using a single projector. FIG. 7B illustrates a projection system operating in the presence of an obstacle. As illustrated, obstacle 72, may partially block the line of sight of projector 25 with respect to target area 115, thus creating an umbra 70. The receiving units located within the region corresponding to the umbra 70, may not receive electromagnetic waves transmitted by projector 25. To reach the receiving units located in the umbra, a second projector may be used. For example, projector 23 may be used to direct electromagnetic waves in the direction of target area 113, which may overlap, at least partially, with umbra 70. In this way, the receiving units located within the umbra may receive electromagnetic waves from projector 23, and gaps in the distributed manifestation may be limited.

Figure 8:
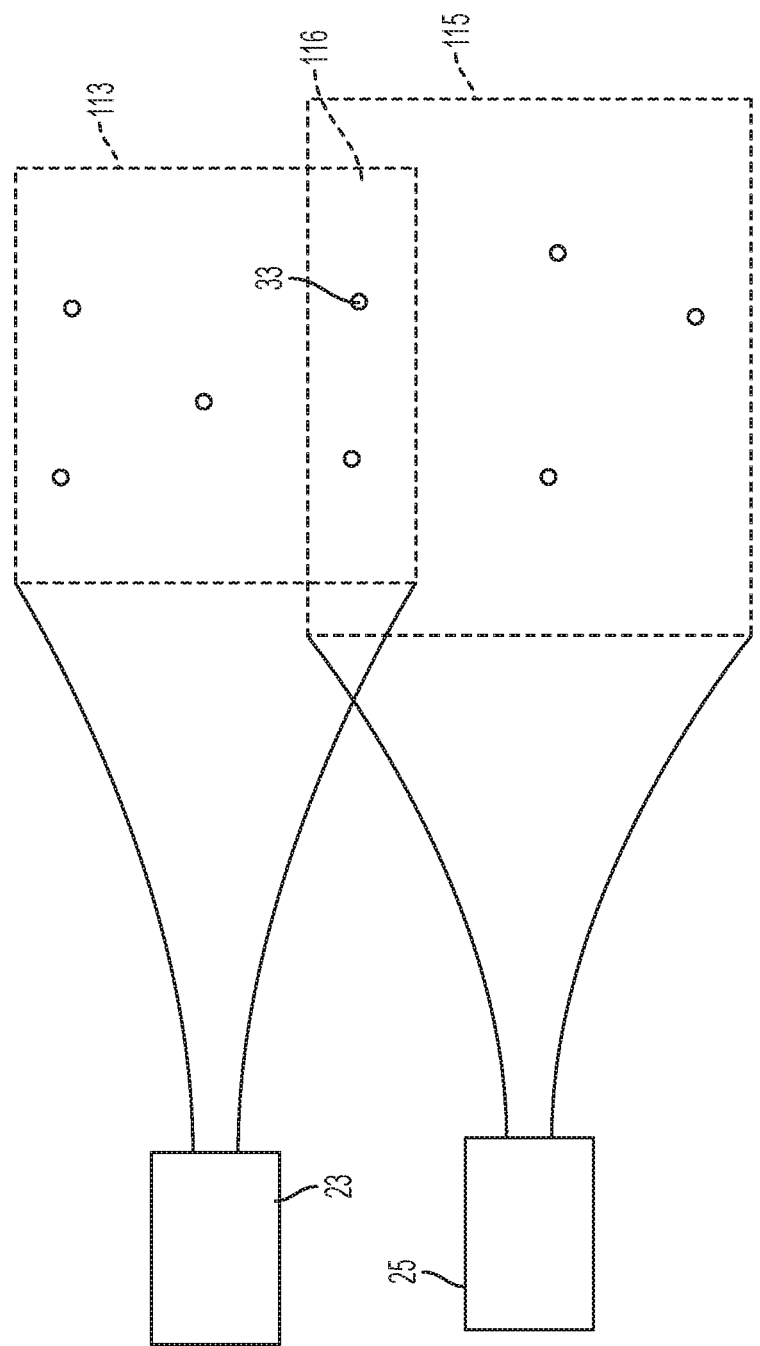
FIG. 8 is a schematic diagram illustrating a plurality of projectors projecting signals covering overlapping areas, according to some non-limiting embodiments.

In other embodiments, target areas corresponding to different projectors may overlap, at least in part. Having target areas that overlap with one another may provide the ability to cover greater distances. Accordingly, a receiving unit may receive multiple electromagnetic waves from multiple projectors, and as such, the power received may be greater. As a result, the projection system may be able to reach receiving units that are farther away from the projectors. Having target areas that overlap with one another may also limit the presence of gaps. In this way, the number of uncovered receiving units may be limited. FIG. 8 is a schematic diagram illustrating a plurality of projectors projecting signals covering overlapping areas, according to some non-limiting embodiments. As illustrated, projector 23 may cover target area 113 and projector 25 may cover target area 115. Target areas 113 and 115 may have an overlapping area 116. A receiving unit 33 located within overlapping area 116 may receive electromagnetic waves by projectors 23 and 25.

In some embodiments, receiving unit 33 may use the state data provided by one projector and may disregard the state data provided by the other projector. The receiving unit 33 may be able to discern the two data sets by the wavelength of the corresponding electromagnetic waves, by the carrier frequency of the corresponding electromagnetic waves, or by the time slot at which the corresponding electromagnetic waves are received. For example, receiving unit 33 may be configured to use only the state data transmitted by the projector positioned in a specific location within the environment, such as near the center of the environment. Assuming that such projector is projector 25, receiving unit 33 may be configured to recognize the wavelength, or frequency, at which projector 25 transmits, for example using a filter, and to filter out state data transmitted at other wavelengths, or frequencies. The filter may have a response such that the desired wavelength or frequency is detected and wavelengths or frequencies outside a predefined range are attenuated. Disregarding all electromagnetic waves but one may be useful when the projectors are not synchronized with one another. In such circumstance, to prevent the mixing of signals that are out-of-sync, only one electromagnetic wave is sensed while the others are filtered out. In some embodiments, one or more projectors, such as projector 23, may be configured to mask out overlapping area 116 from the corresponding target area, so as to avoid transmitting signals to receiving unit 33. At the same time, another projector, such as projector 25, may transmit signals in the direction of overlapping area 116. In this way, ambiguity within overlapping area 116 may be limited. In one non-limiting example, masking of overlapping area 116 may be implemented by placing the micro-mirrors corresponding to overlapping area 116 into a light-blocking state (e.g., a reflective state).

In other embodiments, the receiving unit 33 may combine the electromagnetic waves, and may change state based on a combined state data. For example, the electromagnetic waves may be added to one another, such that the power of the resulting signal is proportional to the sum of the powers of the received electromagnetic waves. In such circumstance, receiving unit 33 may receive the electromagnetic waves transmitted by projectors 23 and 25, and may generate a signal, using a sensor 34, having a power that is proportional to the sum of the powers of the received electromagnetic waves. Because the power of the signal generated by the sensor is greater compared to the case in which only one electromagnetic wave is received, the ability to detect electromagnetic waves may be effectively increased. Such configuration may be particularly useful for reaching areas of an environment that are far from the projectors. Because electromagnetic waves diverge as they propagate in space, a receiving unit located within such area may not receive enough power to detect the signal. However, by adding electromagnetic waves transmitted by multiple projectors, the total power detected by the receiving unit may be increased, thus increasing its ability to detect signals from afar.

Figure 9:
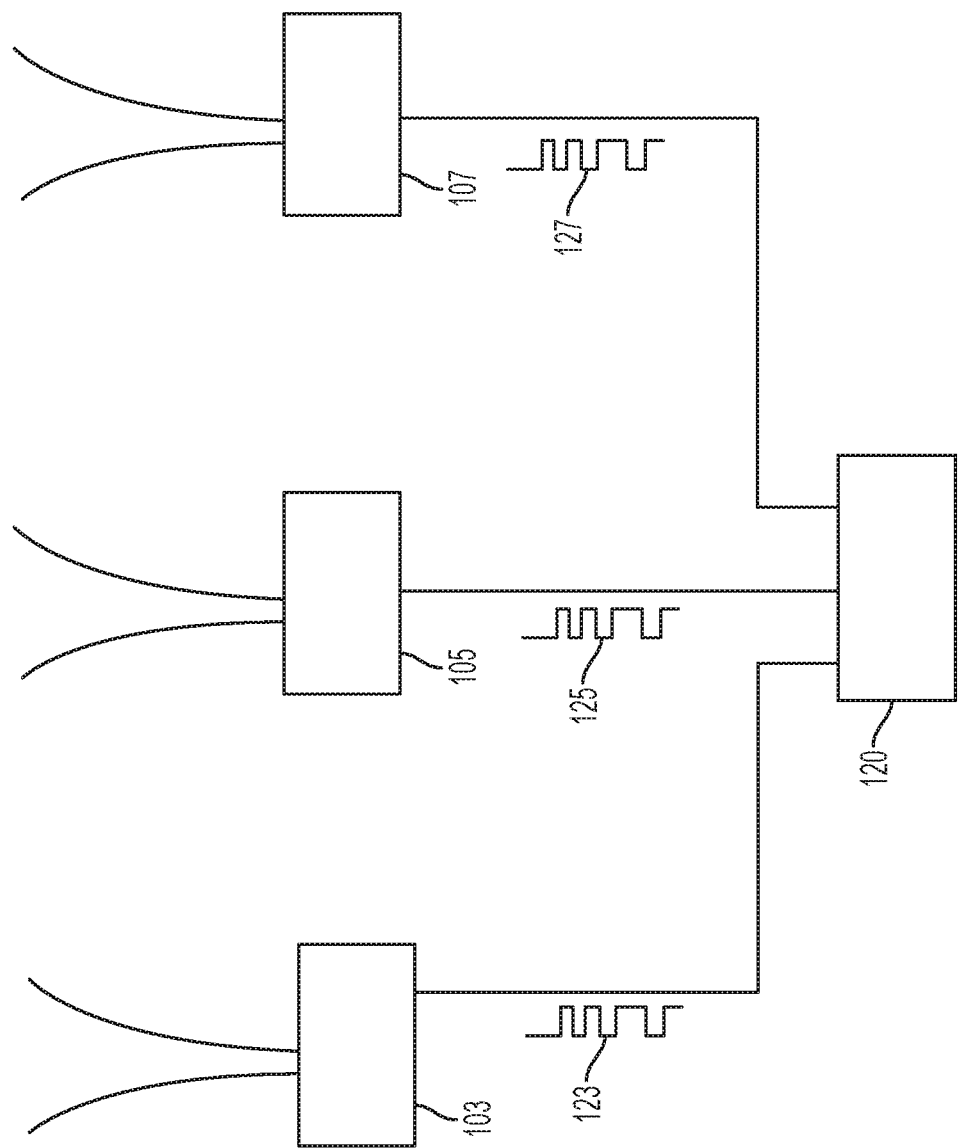
FIG. 9 is a schematic diagram illustrating a processor configured to provide a synchronization sequence to a plurality of projectors, according to some non-limiting embodiments.

To ensure consistency in the distributed manifestation when multiple projectors are used as described in connection with FIGS. 7A, 7B and 8, synchronization of the transmitted signals may be performed. To provide synchronization, a processor may be used. FIG. 9 is a schematic diagram illustrating a processor 120 configured to provide a synchronization sequence to a plurality of projectors, according to some non-limiting embodiments. In some embodiments, processor 120 may serve as processor 62 of FIG. 1. Processor 120 may be connected, via wired connections or wirelessly, to a plurality of projectors such as projectors 103, 105 and 107. In some embodiments, synchronization may be performed at the bit level so that the data streams transmitted by the projectors are consistent with one another. In such embodiments, processor 120 may be configured to transmit a synchronization sequence to the individual projectors. For example, processor 120 may be configured to transmit a synchronization sequence 123 to projector 103, a synchronization sequence 125 to projector 105, and a synchronization sequence 127 to projector 107. The synchronization sequences may be equal to each other in some embodiments. In some embodiments, the timing at which the synchronization sequences may be adjusted to compensate for difference in distances existing between individual projectors and corresponding target areas. In response to receiving the synchronization sequence, a projector may initiate the transmission of state data. A synchronization sequence may comprise any suitable number of bits, such as 8 bits, 16 bits, 24 bits, etc. The Assignee has appreciated that, when modulation is performed independently by each of the multiple projectors, detection errors may arise if the various optical carriers are not properly synchronized. In some embodiments, to prevent such detection errors, the times at which the projectors modulate respective optical carriers may be synchronized. For example, processor 120 may provide a carrier synchronization sequence which triggers the projectors to modulate respective optical carriers approximately at the same time (e.g., within a millisecond). In this way, the projectors may provide modulated optical carriers that are consistent with each other.

Figure 10:
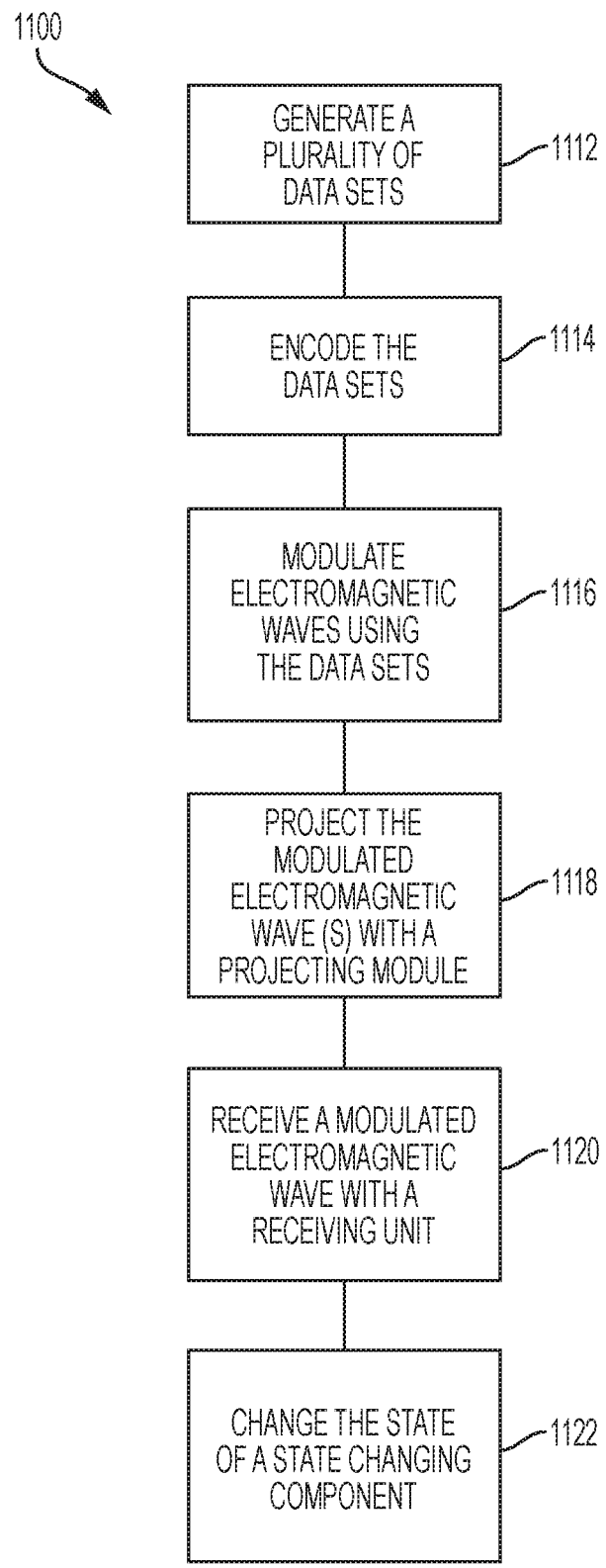
FIG. 10 is a flowchart illustrating a method for providing distributed manifestation, according to some non-limiting embodiments.

One aspect of the present invention is directed to a method for producing a distributed manifestation. A flowchart illustrating such method is provided in FIG. 10. Method 1100 may begin at act 1112, in which a plurality of data sets is generated. The data sets may comprise state data and corresponding spatial coordinate data. The spatial coordinate data may specify a location within a target area in the direction of which the corresponding state data is to be transmitted. The state data may specify the manner in which a state changing component is controlled. For example, state data may specify the brightness of a display screen of a receiving unit, such a watch or a smartphone.

At act 1114, the data sets generated at act 1112 may be encoded in a way so as to limit the number of consecutive equal symbols. For example, an encoding scheme that limits the number of consecutive logical ones, or logical zeros, to fewer than six may be used. Limiting the number of consecutive equal symbols may allow a sensor of a receiving unit to operate within its dynamic range.

At act 1116, an electromagnetic wave may be generated. For example, an optical wave may be generated using a laser or an LED. The electromagnetic wave may be modulated using the data sets. In some embodiments, portions of the electromagnetic wave may be modulated with different state data based on corresponding spatial coordinate data.

At act 1118, the modulated electromagnetic wave may be projected, using a projection module, in the direction of a target area. In some embodiments, the different portions of the electromagnetic wave may be directed in the direction of different sub-areas within the target area.

At act 1120, the modulated electromagnetic wave may be received by a receiving unit positioned within the target area. In some embodiments, the receiving unit may decode the electromagnetic wave using a decoding scheme.

At act 1122, the state of a state changing component may be changed, based on the data received through the modulated electromagnetic wave. For example, the brightness or color of a display screen may be varied.

Figure 11:
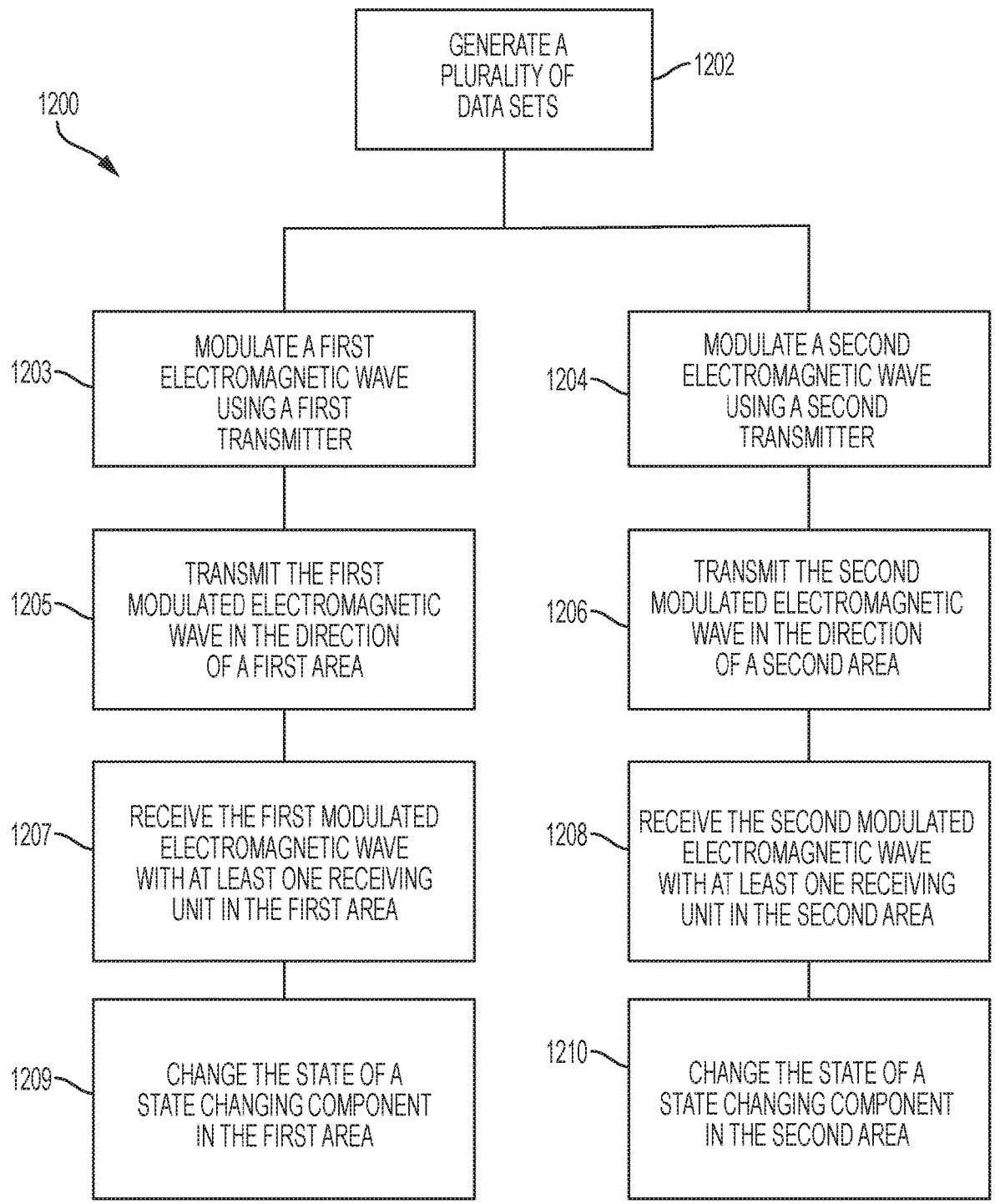
FIG. 11 is a flowchart illustrating another method for providing distributed manifestation, according to some non-limiting embodiments.

One aspect of the present invention is directed to another method for providing distributed manifestation. A flowchart illustrating such method is provided in FIG. 11. Method 1200 may begin at act 1202, in which a plurality of data sets is generated. The data sets may comprise state data and corresponding spatial coordinate data. The spatial coordinate data may specify a locations within multiple target areas in the direction of which the corresponding state data is to be transmitted. The state data may specify a manner in which a state changing component is controlled. For example, state data may specify the brightness of a display screen of a receiving unit, such a watch or a smartphone. The data sets may further comprise, in some embodiments, a synchronization sequence configured to synchronize multiple projectors with respect to one another.

At act 1203, a first portion of the data sets generated at act 1202 may be transmitted, via wired connections or wirelessly, to a first projector. The projector may generate an electromagnetic wave, such as an optical wave, and may modulate the electromagnetic wave using the first portion of the data sets. In some embodiments, portions of the electromagnetic wave may be modulated with different state data based on corresponding spatial coordinate data.

At act 1204, a second portion of the data sets generated at act 1202 may be transmitted, via wired connections or wirelessly, to a second projector. The projector may generate an electromagnetic wave, such as an optical wave, and may modulate the electromagnetic wave using the second portion of the data sets. In some embodiments, portions of the electromagnetic wave may be modulated with different state data based on corresponding spatial coordinate data.

At act 1205, the modulated electromagnetic wave of act 1203 may be transmitted, using a projection module, in the direction of a first area. In some embodiments, the first area may be segmented into multiple sub-areas, and different portions of the electromagnetic wave may be transmitted toward different sub-areas.

At act 1206, the modulated electromagnetic wave of act 1204 may be transmitted, using a projection module, in the direction of a second area. In some embodiments, the second area may be segmented into multiple sub-areas, and different portions of the electromagnetic wave may be transmitted toward different sub-areas.

In some embodiments, the first area and the second area do not overlap, in space, with one another. In this circumstance, a receiving unit positioned in the first area will not receive electromagnetic waves transmitted at act 1206. Similarly, a receiving unit positioned in the second area will not receive electromagnetic waves transmitted at act 1205.

In other embodiments, the first area may overlap, at least partially, with the second area. In such circumstance, a receiving unit positioned within the first area and the second area may receive the electromagnetic waves corresponding to acts 1205 and 1206.

At act 1207, the modulated electromagnetic wave of act 1203 may be received by a receiving unit positioned within the first area. At act 1208, the modulated electromagnetic wave of act 1204 may be received by a receiving unit positioned within the second area.

At act 1209, the state of a state changing component within the first area may be changed, based on the data received through the modulated electromagnetic wave. For example, the brightness or color of a display screen may be varied. Similarly, at act 1210, the state of a state changing component within the second area may be changed, based on the data received through the modulated electromagnetic wave.

Figure 12:
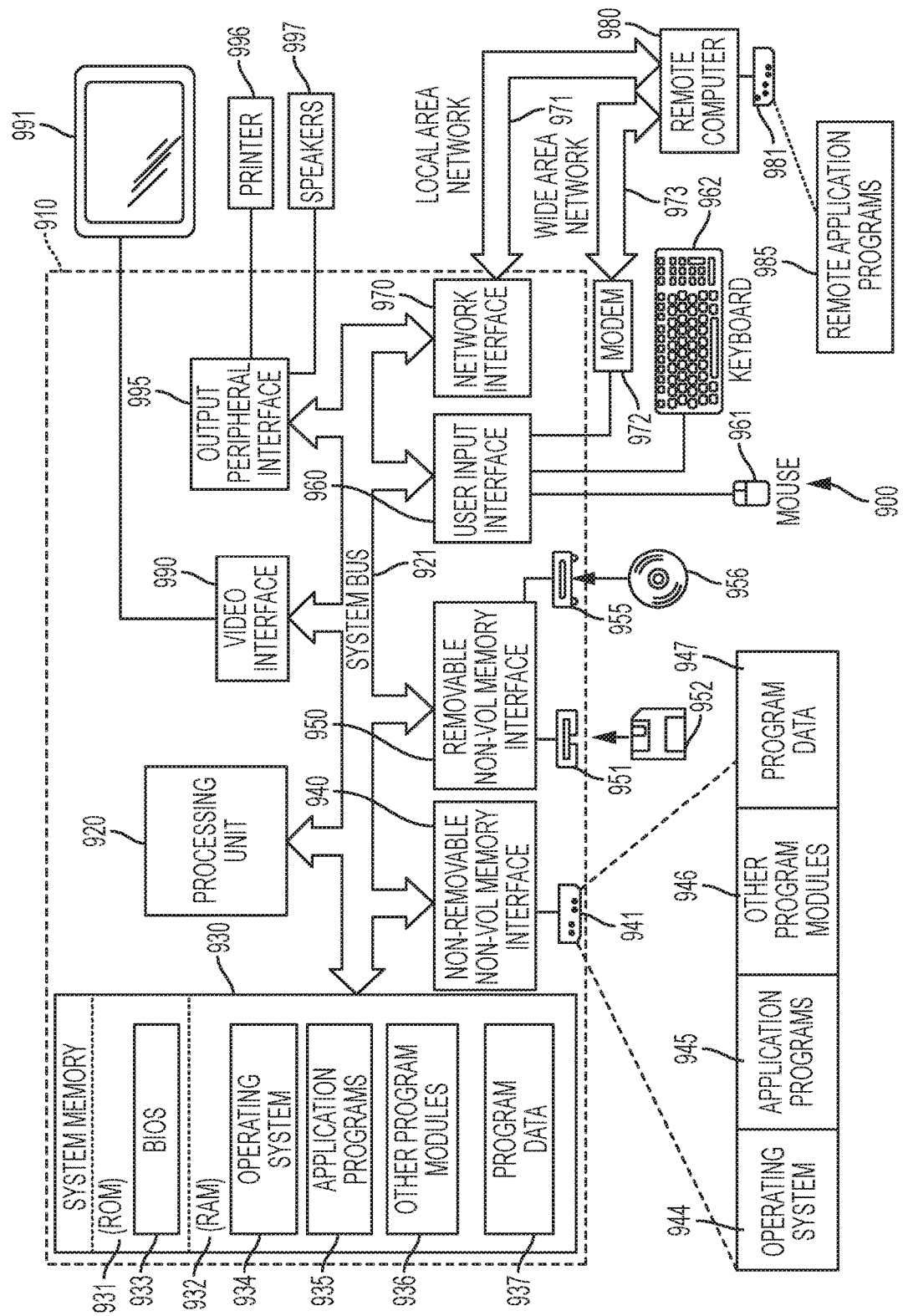
FIG. 12 is a block diagram illustrating a computer system, according to some non-limiting embodiments.

FIG. 12 depicts a general purpose computing device, in the form of a computer 910, which may be used to implement certain aspects of the invention. For example, computer 910 or components thereof may constitute any of the mobile devices, server components and/or networking components described above.

In computer 910, components include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 910. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 12 illustrates operating system 934, application programs 935, other program modules 939, and program data 937.

The computer 910 may also include other removable/non-removable, volatile/nonvolatile computer storage media. By way of example only, FIG. 12 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 959 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 12, provide storage of computer readable instructions, data structures, program modules and other data for the computer 910. In FIG. 12, for example, hard disk drive 941 is illustrated as storing operating system 944, application programs 945, other program modules 949, and program data 947. Note that these components can either be the same as or different from operating system 934, application programs 935, other program modules 539, and program data 937. Operating system 944, application programs 945, other program modules 949, and program data 947 are given different numbers here to illustrate that, at a minimum, they are different copies. A user may enter commands and information into the computer 910 through input devices such as a keyboard 992 and pointing device 991, commonly referred to as a mouse, trackball or touch pad. Other input devices (not shown) may include a microphone, joystick, game pad, satellite dish, scanner, or the like. These and other input devices are often connected to the processing unit 920 through a user input interface 590 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 999, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 12. The logical connections depicted in FIG. 12 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 990, or other appropriate mechanism. In a networked environment, program modules depicted relative to the computer 910, or portions thereof, may be stored in the remote memory storage device. By way of example, and not limitation, FIG. 12 illustrates remote application programs 985 as residing on memory device 981. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been described. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system, comprising:
a plurality of first receiving units located in a first area;
a plurality of second receiving units located in a second area that is separate from the first area;
at least one first transmitter unit configured to transmit first data to the first area, such that none of the plurality of second receiving units receives the first data, the first data comprising first state information corresponding to each of a plurality of target locations; and
at least one second transmitter unit configured to transmit second data to the second area, such that none of the plurality of first receiving units receives the second data, the second data comprising second state information corresponding to each of the plurality of target locations;
wherein each one of the plurality of first receiving units is configured to receive the first data at a first target location of the plurality of target locations, to process the first data, and to express a state in accordance with the first state information that corresponds to the first target location, as a result of the one first receiving unit being at the first target location when the first data is received;
wherein each one of the plurality of second receiving units is configured to receive the second data at a second target location of the plurality of target locations, to process the second data, and to express a state in accordance with the second state information that corresponds to the second target location, as a result of the one second receiving unit being at the second target location when the second data is received.

2. The system of claim 1, wherein the first area surrounds, at least in part, the second area.

3. The system of claim 1, further comprising a processor configured to synchronize the at least one first transmitter unit with the at least one second transmitter unit by providing the at least one first transmitter unit and the at least one second transmitter unit with a synchronization signal.

4. The system of claim 1, wherein each of the plurality of first receiving units and the plurality of second receiving units is configured to express a state selected from a group of states consisting of exhibiting one or more visual characteristics, producing one or more sounds, producing an odor, moving, and exhibiting one or more tactile characteristics.

5. The system of claim 1, wherein each of the plurality of first receiving units and the plurality of second receiving units comprises a state changing component operable to express a state, the state changing component being selected from a group consisting of light-emitting diodes, organic light-emitting diodes, quantum dots, incandescent lights, neon lights, liquid crystal displays, plasma displays, electronic paper displays, electro-chromic displays, thermochromic displays, electromechanically-actuated light filters, electroluminescent elements and phosphorescent elements.

6. The system of claim 1, wherein the at least one first transmitter unit comprises a first light emitter and the first data are encoded in a first optical wave emitted by the first light emitter, and the at least one second transmitter unit comprises a second light emitter and the second data are encoded in a second optical wave emitted by the second light emitter.

7. The system of claim 6, wherein the at least one first transmitter comprises a laser configured to generate the first optical wave.

8. The system of claim 1, wherein the at least one first transmitter unit is configured to transmit the first data to one of the plurality of first receiving units by modulating a first optical wave having a first wavelength and another of the plurality of first receiving units by modulating a second optical wave having a second wavelength different from the first wavelength.

9. A system, comprising:
a plurality of first receiving units located within a first area;
a plurality of second receiving units located within a second area, partially overlapping the first area;
at least one first transmitter unit configured to transmit first data to the first area, the first data comprising first state information respectively corresponding to a plurality of target locations; and
at least one second transmitter unit configured to transmit second data to the second area, the second data comprising second state information respectively corresponding to a plurality of target locations;
wherein each one of the plurality of first receiving units is configured to receive the first data at a first target location of the plurality of target locations, to process the first data, and to express a state in accordance with the first state information that corresponds to the first target location, as a result of each of the first receiving units being at the first target location when the first data is received;
wherein each one of the plurality of second receiving units is configured to receive the second data at a second target location of the plurality of target locations, to process the second data, and to express a state in accordance with the second state information that corresponds to the second target location, as a result of each of the second receiving units being at the second target location when the second data is received; and
wherein at least one of the plurality of first receiving units is configured to receive both the first data and the second data.

10. The system of claim 9, further comprising a processor configured to synchronize the at least one first transmitter unit and the at least one second transmitter unit by providing the at least one first transmitter unit and the at least one second transmitter unit with a synchronization signal.

11. The system of claim 9, wherein each of the plurality of first receiving units and the plurality of second receiving units is configured to express a state selected from a group of states consisting of exhibiting one or more visual characteristics, producing one or more sounds, producing an odor, moving, and exhibiting one or more tactile characteristics.

12. The system of claim 9, wherein each of the plurality of first receiving units and the plurality of second receiving units comprises a state changing component operable to express a state, the state changing component being selected from a group consisting of light-emitting diodes, organic light-emitting diodes, quantum dots, incandescent lights, neon lights, liquid crystal displays, plasma displays, electronic paper displays, electro-chromic displays, thermo-chromic displays, electromechanically-actuated light filters, electroluminescent elements and phosphorescent elements.

13. The system of claim 9, wherein the at least one first transmitter unit comprises a first light emitter and the first data are encoded in a first optical wave emitted by the first light emitter, and the at least one second transmitter unit comprises a second light emitter and the second data are encoded in a second optical wave emitted by the second light emitter.

14. The system of claim 13, wherein the at least one first transmitter comprises a laser configured to generate the first optical wave.

15. The system of claim 9, wherein the at least one first transmitter unit is configured to transmit the first data to a first of the first plurality of receiving units by modulating a first optical wave having a first wavelength and to a second of the first plurality of receiving units by modulating a second optical wave having a second wavelength that is different from the first wavelength.

16. The system of claim 9, wherein the at least one second transmitter unit is configured to mask out a third area in which the first area overlaps the second area.

17. A method, comprising acts of:
(A) processing, by each one of a plurality of first receiving units located at a respective target location in a first area, first data received from at least one first transmitter unit comprising first state information corresponding to the target location, the processing resulting in the one first receiving unit expressing a state in accordance with the first state information; and
(B) processing, by each one of a plurality of second receiving units located at a respective target location in a second area that is separate from the first area, second data received from at least one second transmitter unit comprising second state information corresponding to the target location, the processing resulting in the one second receiving unit expressing a state in accordance with the second state information;
wherein the act (A) comprises each one of the plurality of first receiving units processing first data transmitted to the first area so that none of the plurality of second receiving units receives the first data, and the act (B) comprises each one of a plurality of second receiving units processing second data transmitted to the second area so that none of the plurality of first receiving units receives the second data.

18. The method of claim 17, wherein the first area surrounds, at least in part, the second area.

19. The method of claim 17, wherein the act (A) comprises the plurality of first receiving units processing first data received from at least one first transmitter unit synchronized with the at least one second transmitter unit via a synchronization signal.

20. The method of claim 17, wherein the act (A) comprises the plurality of first receiving units processing the first data so as to express a state selected from a group of states consisting of exhibiting one or more visual characteristics, producing one or more sounds, producing an odor, moving, and exhibiting one or more tactile characteristics.

21. The method of claim 17, wherein the act (A) comprises the plurality of first receiving units processing the first data using a state changing component operable to express a state, the state changing component being selected from a group consisting of light-emitting diodes, organic light-emitting diodes, quantum dots, incandescent lights, neon lights, liquid crystal displays, plasma displays, electronic paper displays, electro-chromic displays, thermo- chromic displays, electromechanically-actuated light filters, electroluminescent elements and phosphorescent elements.

22. The method of claim 17, wherein the at least one first transmitter unit comprises a first light emitter and the first data are encoded in a first optical wave emitted by the first light emitter, and the at least one second transmitter unit comprises a second light emitter and the second data are encoded in a second optical wave emitted by the second light emitter.

23. The method of claim 22, wherein the at least one first transmitter comprises a laser configured to generate the first optical wave.

24. The method of claim 17, wherein the at least one first transmitter unit is configured to transmit the first data to one of the plurality of first receiving units by modulating a first optical wave having a first wavelength and to another of the first plurality of receiving units by modulating a second optical wave having a second wavelength different from the first wavelength.

25. A method, comprising acts of:
(A) processing, by each one of a plurality of first receiving units located at a respective target location in a first area, first data received from at least one first transmitter unit comprising first state information corresponding to the target location, the processing resulting in the one first receiving unit expressing a state in accordance with the first state information; and
(B) processing, by each one of a plurality of second receiving units located at a respective target location in a second area partially overlapping with the first area, second data received from at least one second transmitter unit comprising second state information corresponding to the target location, the processing resulting in the one second receiving unit expressing a state in accordance with the second state information;
wherein the act (A) comprises at least one of the plurality of first receiving units receiving both the first data and the second data.

26. The method of claim 25, wherein the act (A) comprises the plurality of first receiving units processing first data received from at least one first transmitter unit synchronized with the at least one second transmitter unit via a synchronization signal.

27. The method of claim 25, wherein the act (A) comprises the plurality of first receiving units processing the first data so as to express a state selected from a group of states consisting of exhibiting one or more visual characteristics, producing one or more sounds, producing an odor, moving, and exhibiting one or more tactile characteristics.

28. The method of claim 25, wherein the act (A) comprises the plurality of first receiving units processing the first data using a state changing component operable to express a state, the state changing component being selected from a group consisting of light-emitting diodes, organic light-emitting diodes, quantum dots, incandescent lights, neon lights, liquid crystal displays, plasma displays, electronic paper displays, electro-chromic displays, thermo-chromic displays, electromechanically-actuated light filters, electroluminescent elements and phosphorescent elements.

29. The method of claim 25, wherein the at least one first transmitter unit comprises a first light emitter and the first data are encoded in a first optical wave emitted by the first light emitter, and the at least one second transmitter unit comprises a second light emitter and the second data are encoded in a second optical wave emitted by the second light emitter.

30. The method of claim 29, wherein the at least one first transmitter comprises a laser configured to generate the first optical wave.

31. The method of claim 25, wherein the at least one first transmitter unit is configured to transmit the first data to one of the plurality of first receiving units by modulating a first optical wave having a first wavelength and to another of the first plurality of receiving units by modulating a second optical wave having a second wavelength different from the first wavelength.

32. The method of claim 25, wherein the act (B) comprises the plurality of second receiving units processing second data from at least one second transmitter unit which masks out a third area in which the first area overlaps the second area.

* * * * *